United States Patent
Sánchez Henares

(10) Patent No.: US 11,004,324 B1
(45) Date of Patent: May 11, 2021

(54) POOL ALARM

(71) Applicant: Jet Rocafort of America, Inc., Coral Gable, FL (US)

(72) Inventor: José María Sánchez Henares, Valencia (ES)

(73) Assignee: Jet Rocafort of America, Inc., Coral Gables, FL (US)

( * ) Notice: Subject to any disclaimer, the term of this patent is extended or adjusted under 35 U.S.C. 154(b) by 0 days.

(21) Appl. No.: 16/937,601

(22) Filed: Jul. 24, 2020

(51) Int. Cl.
| | |
|---|---|
| G08B 23/00 | (2006.01) |
| G08B 21/08 | (2006.01) |
| H02J 7/35 | (2006.01) |
| G01S 15/04 | (2006.01) |
| G08B 3/10 | (2006.01) |
| H02J 7/00 | (2006.01) |

(52) U.S. Cl.
CPC ............ G08B 21/08 (2013.01); G01S 15/04 (2013.01); G08B 3/10 (2013.01); H02J 7/0048 (2020.01); H02J 7/35 (2013.01)

(58) Field of Classification Search
CPC ......... G08B 21/08; G08B 3/10; H02J 7/0048; H02J 7/35; G01S 15/04
See application file for complete search history.

(56) References Cited

U.S. PATENT DOCUMENTS

| | | | |
|---|---|---|---|
| 5,049,859 A | 9/1991 | Arnell | |
| 6,093,069 A * | 7/2000 | Schelfhout | B63C 7/26 |
| | | | 441/11 |
| 7,312,981 B2 * | 12/2007 | Carroll | G06F 1/1613 |
| | | | 345/169 |
| 8,134,462 B1 | 3/2012 | Tran et al. | |
| 8,193,936 B2 | 6/2012 | Houston | |
| 9,508,242 B2 | 11/2016 | Podlisker | |
| 10,062,259 B2 | 8/2018 | Sentosa et al. | |
| 10,589,699 B2 * | 3/2020 | Mason | H04W 4/44 |
| 10,665,073 B1 * | 5/2020 | Richerson, Jr. | G03B 17/08 |
| 10,741,048 B1 * | 8/2020 | Foster | A61B 5/7455 |
| 10,757,968 B1 * | 9/2020 | Siefert | A24F 1/30 |
| 10,878,684 B1 * | 12/2020 | Eller | G08B 25/10 |

(Continued)

OTHER PUBLICATIONS

Karthik et al., IoT Based Safety Enhanced Swimming Pool with Embedded Techniques to Reduce Drwoning Accidents (Year: 2020).*

(Continued)

*Primary Examiner* — Quang Pham
(74) *Attorney, Agent, or Firm* — Pablo Meles; GrayRobinson, PA

(57) ABSTRACT

A floating alerting device includes a housing enclosure which floats when closed, a rechargeable battery within the housing enclosure, a wireless transmitter circuit coupled to the rechargeable battery and housed within the housing enclosure, and one or more sensors configured for detecting objects entering a body of water or for measuring one or more among water quality, water temperature, or pool usage or tub usage where the one or more sensors are coupled to the wireless transmitter circuit and housed within the housing enclosure. The floating alerting device further includes an antenna coupled to the wireless transmitter circuit and one or more processors coupled to the wireless transmitter circuit and configured to transmit data from the one or more sensors to a remote computing device.

20 Claims, 4 Drawing Sheets

(56) References Cited

U.S. PATENT DOCUMENTS

| | | | | |
|---|---|---|---|---|
| 2002/0179728 | A1* | 12/2002 | Beidokhti | B05B 17/08 239/20 |
| 2003/0068936 | A1* | 4/2003 | Yerazunis | G01F 1/005 441/11 |
| 2003/0222782 | A1* | 12/2003 | Gaudreau | G08B 21/082 340/573.6 |
| 2004/0208499 | A1* | 10/2004 | Grober | B63B 29/12 396/428 |
| 2004/0246703 | A1* | 12/2004 | Adams | F21V 7/26 362/84 |
| 2005/0258969 | A1* | 11/2005 | Hoenig | G08B 21/082 340/573.6 |
| 2006/0092630 | A1* | 5/2006 | Kennedy | F21S 8/00 362/157 |
| 2006/0205296 | A1* | 9/2006 | Esson | B66D 1/06 441/69 |
| 2007/0123121 | A1* | 5/2007 | Quintero | B63C 9/0005 441/6 |
| 2007/0132578 | A1* | 6/2007 | Powell | G08B 21/023 340/539.26 |
| 2008/0048870 | A1* | 2/2008 | Laitta | G08B 25/08 340/573.6 |
| 2008/0194160 | A1* | 8/2008 | Concannon | B63B 22/04 441/22 |
| 2009/0064403 | A1* | 3/2009 | Wolfe | G08B 21/082 4/504 |
| 2009/0237045 | A1* | 9/2009 | Dishman | H02M 7/4807 323/271 |
| 2009/0295566 | A1* | 12/2009 | Weintraub | G08B 21/088 340/539.11 |
| 2009/0303055 | A1* | 12/2009 | Anderson | G08B 21/086 340/573.6 |
| 2010/0034588 | A1* | 2/2010 | Dick | F03B 13/20 405/76 |
| 2010/0176956 | A1* | 7/2010 | Moerschell | E04H 4/06 340/573.6 |
| 2010/0182151 | A1* | 7/2010 | Yang | G08B 21/088 340/573.1 |
| 2010/0186159 | A1* | 7/2010 | Dalickas | E04H 4/06 4/504 |
| 2011/0074586 | A1* | 3/2011 | Chen | G08B 21/08 340/573.6 |
| 2011/0090763 | A1* | 4/2011 | Chen | H04B 11/00 367/131 |
| 2011/0307106 | A1* | 12/2011 | Dutt | E03F 7/00 700/282 |
| 2013/0345982 | A1* | 12/2013 | Liu | G01W 1/16 702/4 |
| 2014/0116311 | A1* | 5/2014 | Holemans | B63C 7/003 114/39.23 |
| 2014/0259464 | A1* | 9/2014 | Renaud | E04H 4/1654 15/1.7 |
| 2015/0068652 | A1* | 3/2015 | Burris | E04H 4/103 150/154 |
| 2015/0104064 | A1* | 4/2015 | Guissin | G06T 7/32 382/103 |
| 2015/0161870 | A1* | 6/2015 | Podlisker | G08B 21/08 340/573.6 |
| 2016/0012700 | A1* | 1/2016 | Matko | G08B 21/086 340/573.6 |
| 2016/0104359 | A1* | 4/2016 | AlMahmoud | G01S 15/42 367/112 |
| 2016/0145884 | A1* | 5/2016 | Erlich | E04H 4/1636 15/1.7 |
| 2016/0147223 | A1* | 5/2016 | Edwards | G05D 1/0088 701/2 |
| 2016/0180683 | A1* | 6/2016 | Fourie | E04H 4/06 340/573.6 |
| 2017/0098361 | A1* | 4/2017 | Sentosa | G01N 33/18 |
| 2017/0124841 | A1* | 5/2017 | Snyder | G08B 21/088 |
| 2017/0167151 | A1* | 6/2017 | Segal | B63C 9/02 |
| 2017/0267547 | A1* | 9/2017 | Miller | C02F 1/66 |
| 2017/0294094 | A1* | 10/2017 | Watkins | G01S 7/003 |
| 2017/0356212 | A1* | 12/2017 | Hanan | E04H 4/1654 |
| 2017/0365150 | A1* | 12/2017 | Bennett | G06N 20/00 |
| 2018/0040223 | A1* | 2/2018 | Bodi | G08B 21/086 |
| 2018/0067014 | A1* | 3/2018 | Bright | G01M 3/3254 |
| 2018/0191390 | A1* | 7/2018 | Barry | H04W 4/42 |
| 2018/0275173 | A1* | 9/2018 | Hoffman | G08B 3/10 |
| 2018/0311558 | A1* | 11/2018 | Rowland | E04H 4/065 |
| 2018/0317461 | A1* | 11/2018 | Meeker | A01K 61/60 |
| 2018/0347157 | A1* | 12/2018 | Brotherton | E03B 7/078 |
| 2019/0087548 | A1* | 3/2019 | Bennett | E04H 4/1654 |
| 2019/0108745 | A1* | 4/2019 | Tepper | E04H 4/06 |
| 2019/0114891 | A1* | 4/2019 | Eck | G08B 17/06 |
| 2019/0136557 | A1* | 5/2019 | Jensen | G01F 23/00 |
| 2019/0246030 | A1* | 8/2019 | Kambar | H04N 5/232933 |
| 2019/0278441 | A1* | 9/2019 | Haupt | G01W 1/10 |
| 2019/0287378 | A1* | 9/2019 | Rogers | G08B 21/084 |
| 2019/0318536 | A1* | 10/2019 | Nemetz | G06T 17/05 |
| 2019/0318603 | A1* | 10/2019 | Hurt | G06F 16/75 |
| 2019/0391611 | A1* | 12/2019 | Foster | G06F 1/163 |
| 2020/0022360 | A1* | 1/2020 | Priest | A01M 31/06 |
| 2020/0118412 | A1* | 4/2020 | Anderson | G06K 9/00369 |
| 2020/0135000 | A1* | 4/2020 | Asiri | G05D 1/0011 |
| 2020/0242906 | A1* | 7/2020 | Gali | H04N 7/181 |
| 2020/0247513 | A1* | 8/2020 | Garner | B63C 9/125 |
| 2020/0250337 | A1* | 8/2020 | Armon | G05B 19/4155 |
| 2020/0311227 | A1* | 10/2020 | Bennett | H04L 67/125 |

OTHER PUBLICATIONS

Wyczarska-Kokot et al., Impact of Swimming Pool Water Treatment System Factors on the Content of Selected Disinfection by Products (Year: 2020).*

Xiao et al., Research and Design of Zigbee-Based Swimming Pool Positioning Anti-Flooding Device (Year: 2018).*

* cited by examiner

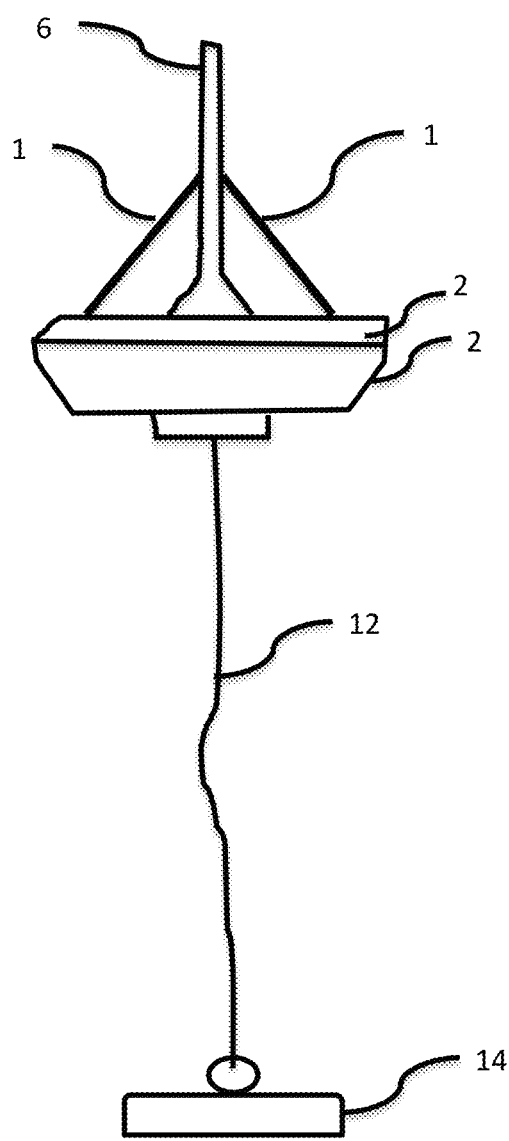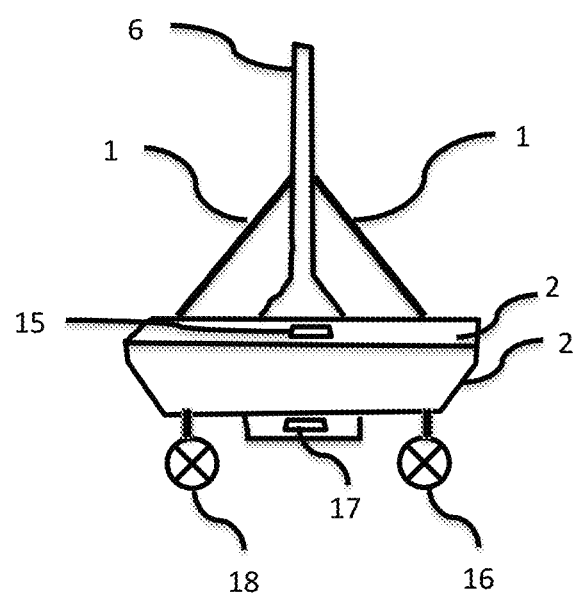
30A
FIG. 3A
30B
FIG. 3B

POOL ALARM

CROSS-REFERENCE TO RELATED APPLICATIONS

Not Applicable.

BACKGROUND

The present disclosure is directed to an apparatus and system for aiding in detecting the entry of a mass or body into a pool or tub and further provides water quality measurements.

DESCRIPTION OF THE RELATED ART

Current methods to address some of the issues resolved by the current embodiments use devices that sense motion in the water but fail to have modes to eliminate false alarms, fail to provide water quality measurements or fail to have power resources that eliminate other sources of error or inoperability.

BRIEF DESCRIPTION OF THE DRAWINGS

FIG. 3A illustrates a first variation of the pool alarm apparatus or system of FIG. 1 in accordance with the embodiments;

FIG. 3B illustrates a second variation of the pool alarm apparatus or system of FIG. 1 in accordance with the embodiments;

DETAILED DESCRIPTION

Figure 1:
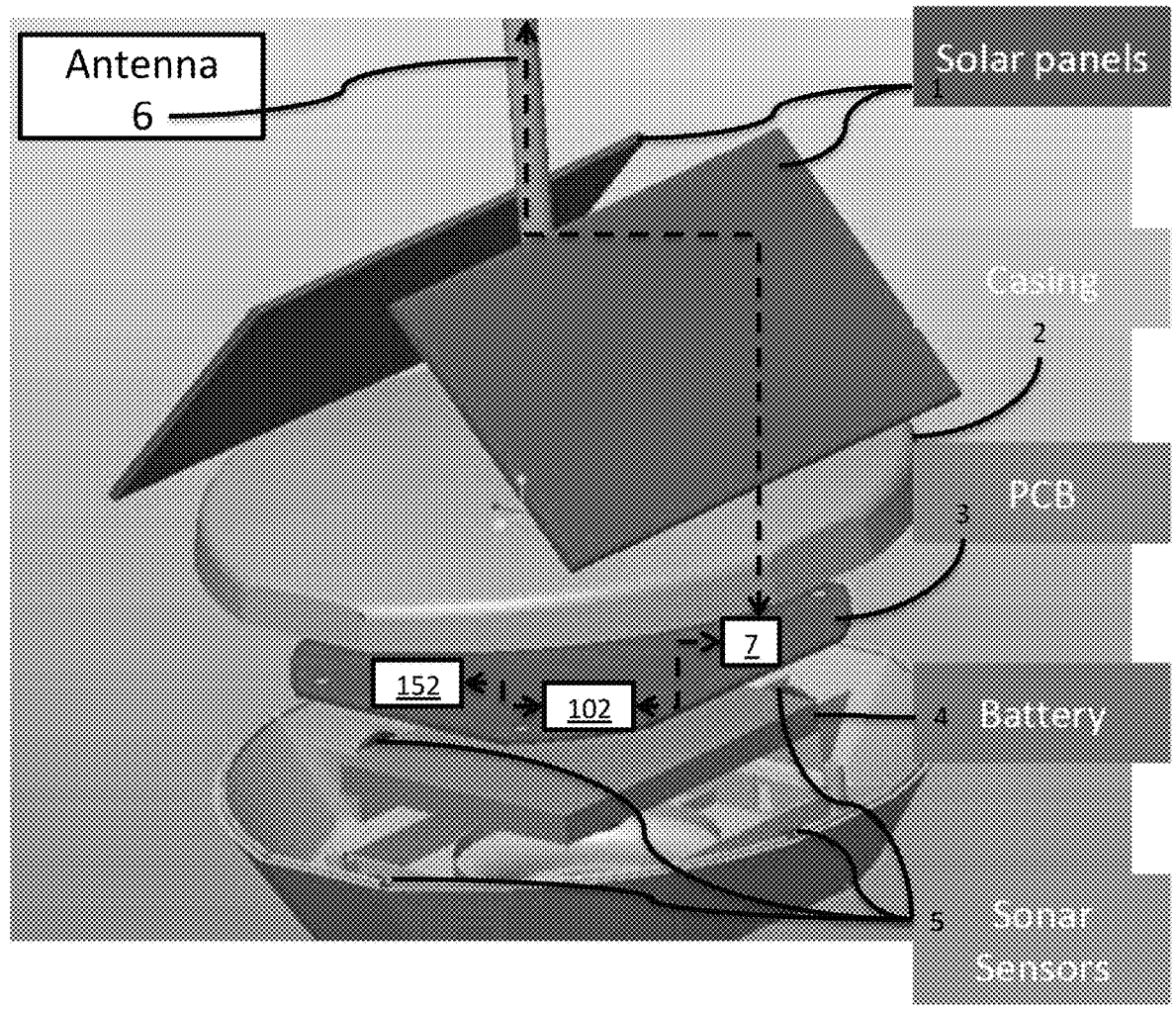
FIG. 1 illustrates an exploded view of a pool alarm apparatus or system in accordance with the embodiments.

In some embodiments, a pool alarm apparatus or floating alerting device 10 as illustrated in FIGS. 1, 2A, 2B, 2C, and 2D can include a housing enclosure or casing 2 which floats when closed, a rechargeable battery or power source 4 enclosed within the housing enclosure 2, a wireless transmitter circuit 7 coupled to the rechargeable battery and housed within the housing enclosure 2, and one or more sonar sensors 5 coupled to the wireless transmitter circuit 7 and housed within the housing enclosure 2. The device 10 can further include an antenna 6 coupled to the wireless transmitter circuit 7 and at least one solar panel 1 mounted on a top surface of the housing enclosure 2 and operatively coupled to the rechargeable battery 4 for charging the rechargeable battery 4.

Figure 2A:
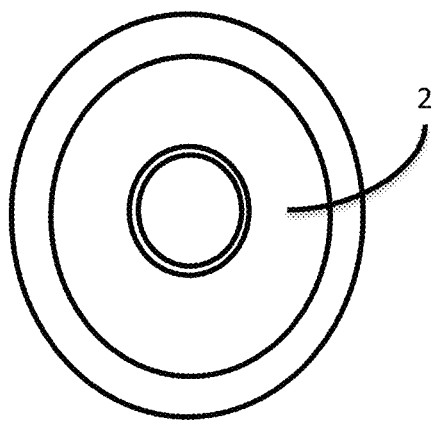
FIG. 2A illustrates a bottom view of the pool alarm apparatus of FIG. 1 in accordance with the embodiments.
Figure 2B:
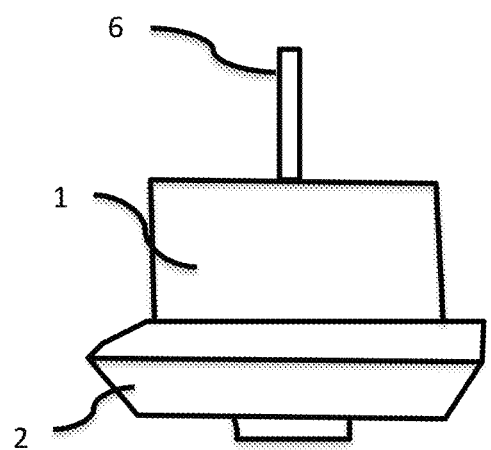
FIG. 2B illustrates a front view of the pool alarm apparatus of FIG. 1 in accordance with the embodiments.
Figure 2C:
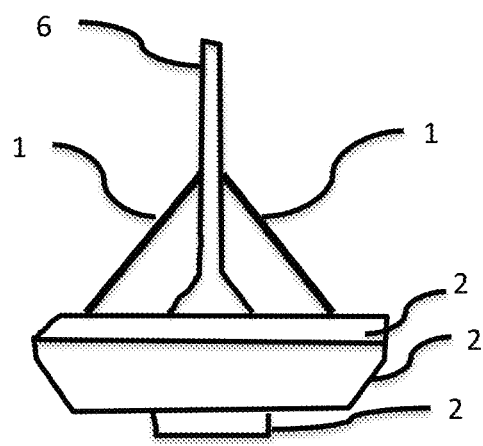
FIG. 2C illustrates a side view of the pool alarm apparatus of FIG. 1 in accordance with the embodiments.
Figure 2D:
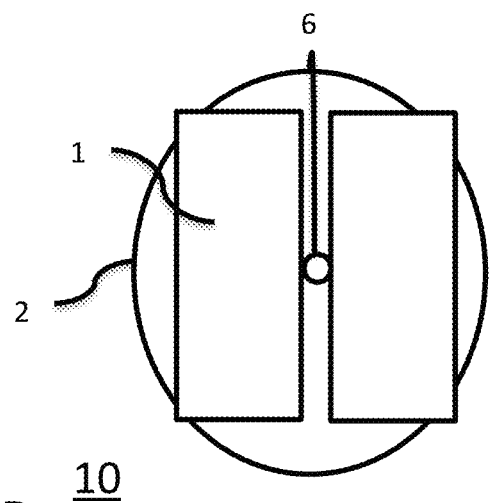
FIG. 2D illustrates a top view of the pool alarm apparatus of FIG. 1 in accordance with the embodiments.

FIG. 2A illustrates the bottom portion of the housing enclosure 2 of the floating alerting device 10 while FIG. 2B illustrates a front elevation view of the floating alerting device 10 with the solar panels angled to optimize the exposure to the sun's energy as can be better viewed in the side view of FIG. 2C. FIG. 2D illustrates a top view of the floating alerting device 10. Although two solar panels 1 are shown in the examples, the embodiments are not limited to any particular number of solar panels and thus any number of solar panels can be used.

In some embodiments, the device 10 further includes a printed circuit board 3, which is housed within the housing enclosure 2. In some embodiments, the printed circuit board can be a flex circuit or embedded printed circuitry that resides directly on the inner surface of the housing enclosure 2. In some embodiments, the one or more sonar sensors 5 are coupled to one or more processors (see 102 of FIG. 1 or FIG. 4, for example).

In some embodiments the floating alerting device 10 further includes one or more processors (102) coupled to one or more sonar sensors 5 configured for detecting objects entering a body of water and further coupled to one or more other sensors 152 for measuring one or more among water quality, water temperature, or swimming pool or tub usage or other parameters. In some embodiment, the one or more processors 102 are configured to transmit data from the one or more sonar sensors 5 or the one or more other sensors 152 to a remote server using a transmitter or transceiver such as the network interface device 116 shown in FIG. 4.

Figure 4:
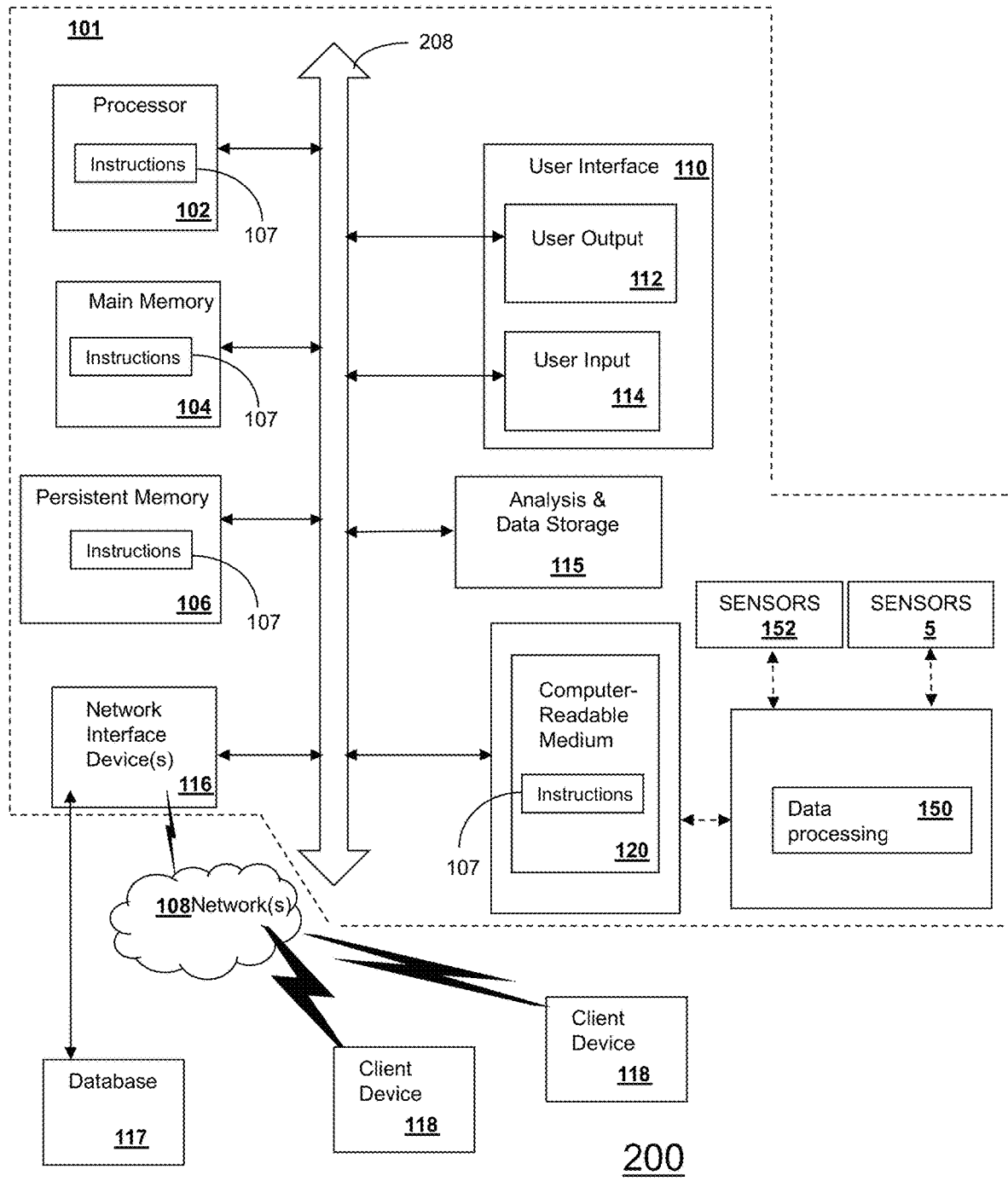
FIG. 4 is a block diagram of a system in accordance with the embodiments.

In some embodiments, the floating alerting device 10 can include a audible speaker (such as the user output 112) shown in FIG. 4) coupled to the one or more processors 102 wherein the one or more processors 102 are configured to have the wireless transmitter circuit 116 transmit a wireless alarm signal to at least one client device 118 when the one or more sonar sensors 5 detects motion in a body of water and awaits for a response from the at least one client device 118 for a threshold period of time whereupon at the expiration of the threshold period of time and lack of the response from the at least one client device, the one or more processors causes the audible speaker 112 to sound an audible alert. In some embodiments, the wireless transmitter circuit can be a Bluetooth wireless transceiver circuit or other suitable wireless communication device.

In some embodiments, the one or more processors 102 are configured to monitor power levels of the rechargeable battery 4 and further cause the floating alerting device 10 to enter a lower power mode in the event the power level drops below a predetermined power level such as 20%.

In some embodiments, the one or more processors 102 are configured to create a three-dimensional model of a body of water that the floating alerting device is floating in to enable a number of different functions or measurements. For example, the system could provide one or more among estimates of evaporation rates, detection of unmoving objects in the body of water, or detect cracks on a surrounding wall holding the body of water. In some embodiments, the one or more processors 102 are configured to monitor local weather conditions and have the floating alerting device 10 operate as an emergency beacon under conditions of storms, flash flooding, or sudden drops in temperature. The local weather conditions can be monitored via a wireless internet connection using the network interface device 116 and networks 108 to a data source provided by a client device 118 or a database 117.

In other embodiments, the one or more processors 102 are configured to monitor weather patterns and water temperature and further transmit advisory information to one or more client devices 118 to inform a need for chemical treatment of a body of water based on the monitored weather patterns or water temperature or transmit advisory information to one or more client devices 118 of a need for removal of the floating alerting device from the body of water due to hail or a freeze condition. The advisory information can further include a reminder to return the floating alerting device to the body of water upon the passing of the hail or the freeze condition or weather condition necessitating the removal of the floating alerting device 10 from the body of water.

In some embodiments and with reference to FIGS. 3A and 3B the floating alerting device 30A or 30B can further include an anchoring device that enables the device to remain within range of a desired location within a pool using one among a weighted anchor 14 tied to the bottom of the floating alerting device 30A or a propulsion system such as electric motors 16 and 18 coupled to the bottom of the floating alerting device 30B.

In some embodiments, the one or more processors 102 are configured to enable the device (10) to remain in a sleep mode when detecting predetermined paired devices (118 of FIG. 4, for example) within a predetermined range and further enter a pre-alert mode when detecting other predetermined devices.

In some embodiments, the one or more processors 102 are configured to cause the transmitter to communicate and be interoperable with one or more among client devices such as headphones, smart televisions, smartphones, game consoles, vehicles, cell towers, pool cleaning systems, home alarm systems, desktop computers, laptop computers, tablets, or smart home appliances.

In some embodiments, the floating alerting device can further include one or more among a 360 camera or an infrared camera. In some embodiments such camera or cameras can be placed below the waterline or toward the bottom of the housing enclosure 2 as shown with camera 17 of FIG. 3B while in other embodiments such camera or cameras can be place above the waterline or towards the top portion of the housing enclosure 2 as shown with camera 15 of FIG. 3B.

In some embodiments, the floating alerting device can further include a speaker (112 of FIG. 4) and a microphone (114 of FIG. 4) coupled to the one or more processors 102 where the one or more processors 102 are configured to enable two-way wireless audible communication.

In one embodiment, a floating alerting device 10 can include a housing enclosure 2 which floats when closed, a rechargeable battery 2 within the housing enclosure 2, a wireless transmitter circuit 7 (or 116 of FIG. 4) coupled to the rechargeable battery 4 and housed within the housing enclosure, and one or more sonar sensors 5 configured for detecting objects entering a body of water and coupled to the wireless transmitter circuit 7 (or 116) and housed within the housing enclosure 2. The floating device 10 can further include one or more other sensors 152 coupled to the wireless transmitter circuit 7 (or 116) and configured for measuring one or more among water quality, water temperature, or swimming pool usage or tub usage or other parameters, an antenna 6 coupled to the wireless transmitter circuit 7, and one or more processors 102 coupled to the wireless transmitter circuit 7 and configured to transmit data from the one or more sonar sensors 5 or the one or more other sensors 152 to a remote computing device (118 or 117 of FIG. 4, for example). In some embodiments, the floating alerting device 10 can further include at least one solar panel 1 mounted on a top surface of the housing enclosure 2 and operatively coupled to the rechargeable battery 4 for charging the rechargeable battery. 4

In some embodiments, the floating alerting device 10 can include a housing enclosure 2 which floats when closed, a rechargeable battery 4 within the housing enclosure 2, a wireless transmitter circuit 7 (or 116) coupled to the rechargeable battery 4 and housed within the housing enclosure 2, one or more sensors (5 and/or 152) configured for detecting objects entering a body of water or for measuring one or more among water quality, water temperature, or swimming pool usage or tub usage where the one or more sensors are coupled to the wireless transmitter circuit 7 and housed within the housing enclosure 2. The floating alerting device 10 can further include an antenna 6 coupled to the wireless transmitter circuit 7, one or more processors 102 coupled to the wireless transmitter circuit 7 and configured to transmit data from the one or more sensors (5 or 152) to a remote computing device (117 or 118), and at least one solar panel 1 mounted on a top surface of the housing enclosure 2 and operatively coupled to the rechargeable battery 4 for charging the rechargeable battery 4.

In summary, a floating alerting device can be connected wirelessly while floating in a body of water (such as that of a swimming pool or tub) and relays an alarm when any body or object enters the body of water when not set to standby mode. During its operation the floating alerting device can also gather information on water quality, water temperature, swimming pool usage, or other parameters and upload such data to servers (such as database 117 of FIG. 4) for monitoring.

The floating alerting device 10 can use a sonar sensor or a set of sonar sensors to detect movement in water and relays an alarm to a user or users of an Application or "App" on a client device such as client device 118. The App can be used to alert the user when the user has not disabled this function because the user themselves are in the body of water (where the floating alerting device 10 resides) or in other scenarios.

Operationally, the floating alerting device 10 has a quick set up procedure that will typically take less than five (5) minutes to set up. In some embodiments, the device 10 is made aware of the physical location of the device using GPS or other location sensing devices (and further know the swimming pool estimated size in terms of square area or gallons or both). When an alert is sent from the device 10 to an App on a client device, the device 10 can be configured to output a very powerful sound alarm if the user of the App does not respond within a predetermined time period or threshold period such as 5 seconds. The sound alarm can be loud enough to alert nearby people and even neighbors of the incidence.

The operative range of the device 10 is dictated by the latest wireless standard implemented in the device such as the Bluetooth standard. This however can be greatly increased with complementary devices such as repeaters and signal boosters which are contemplated in the ecosystem.

The solar panels 1 power the device 10 so that the user does not need to worry about any maintenance or at least mitigates concerns over power. In the rare event of power dropping below a threshold such as 20%, the user can be notified so that the user can take remedial action. At the same time the device 10 can enter a low power or low scan mode to lengthen the operational time of the device.

The device 10 aims to eliminate the accidental drowning incidents and the resulting injuries or even deaths caused by incidents. The embodiments complement other solutions, mostly physical barriers, in order to provide a safe method for swimming and other pool usage.

As noted above, the device 10 can create a 3D model of the body of water, swimming pool or tub where it is floating. This process with current processors can take anywhere from 10 to 300 seconds depending on the size of the pool and other parameters. Through this creation of a model of the pool area or area of the body of water (which can be checked against current parameters when different variables are met), the system can estimate evaporation rates, detect unmoving objects in the water, find cracks in the walls of the body of water (for example, as they appear in the swimming pool), and can help locate objects and inform the user of the same even when lightning conditions make it difficult to do so.

Since the location of the device can be monitored in certain embodiments (using GPS, cellular triangulation, beacon signals from wireless gateways or routers, cell tower identifiers, a priori location data entered at system setup, etc.), the device 10 can use the location information to provide a number of safety features to the users. For example, the device 10 can act as an emergency beacon for incoming adverse meteorological conditions such as storms, flash flooding, sudden drops in temperature expected or other weather conditions, which might be hazardous to users. If the swimming pool is being used and even if the user has permissions to use the swimming pool at the time, if a hazardous weather signal alerts the device, the device can also transmit a signal to all family paired devices that the swimming pool is in use and that it should be vacated.

In some embodiments, through the analysis of weather patterns and water temperature, the device and system can advise users when it is better to use chemical products in the water and which ones are more convenient as the seasons change. Although embodiments do not dispense such chemical products but rather advise and help save money and improve safety, some embodiments can further contemplate dispensing chemicals as required.

In the event of a cold weather which could freeze the body of water, or with potential hail, the device 10 can alert the device owner of such event in order for it to be removed from the swimming pool or other body of water. Once this alert has passed, the user can be informed of this situation so that the device 10 can again be placed in the body of water. During this eventuality, the user might elect to receive reminders of the "unprotected" status of its swimming pool.

The device 10 has several possible mechanisms to stay in the best location of a swimming pool for optimal security and functionality. Generally, the device 10 can utilize an anchor point which is particularly convenient for large outdoor swimming pools as it allows multiple devices to be used in a single swimming pool without fear of them coalescing into a single point. The anchor point can be maintained simply with a weighted anchor 14 such as one tied to a rope 12. Other embodiments can utilize a propulsion system and given battery, swimming pool usage, and weather parameters, will attempt to periodically move the device to the optimal position in the swimming pool using the propulsion system. In one embodiment, the propulsion system can be electric motors 16 and 18 that can use propellers and rotation to place the device 10 where desired.

Further note that the device 10 can have different behaviors based on the existence/absence of users with the paired devices. The different behaviors can be user configurable and allows the device to be asleep if allowed users are within a certain range so as not to be too intrusive or create false alarms. Conversely, the device 10 can be set to respond with a pre-alert should a user wearing a marked or designated device (bracelet or any other type of wearable) approach the body of water without having been allowed to do so. For example, a baby or toddler wearing such a paired wearable device can cause the pre-alert when the baby or toddler approaches the body of water with a predetermined range. This provides for an early warning system that can certainly prevent accidents and save lives. The system operating in conjunction with device 10 can handle all the device pairings and user configurations and which can be stored in a cloud server, device Apps, and the device's memory (see 104, 106, or 120 of FIG. 4).

In some embodiments, the device 10 can receive over the air firmware updates to add functionalities. This allows its functionality to be extended and thus lowering the replacing rate.

In some embodiments, the device 10 can have an internal clock which alters its behavior depending on time of the day/day of the year. This is user configurable and allows for a degree of alertness depending on the time of the year/time of the day.

The device and system can take advantage of the connectivity potential that the device represents and can further utilize APIs and APPs/Programs for it to share information with other devices. This concept enables the device 10 to sound the alarm not only for itself, but in as many connected devices as possible within a certain radius. Examples of interoperability with other devices can include is not limited by, Headphones, Smart TVs, Smartphones, game consoles, cars or vehicles, cell towers, wireless gateways and routers, pool cleaning systems, home alarm systems, computers, Smart home appliances (which could stop working to stop noise interfering with the alarm or sound their own alarm), or tablets.

As noted above, some embodiments can include a 360° camera or an infrared camera and LTE/5G connection. Such cameras can further enhance the ability to detect alerting situations underwater or above water and in different environmental conditions. Other embodiments can also optionally or additional include a speaker and microphone allowing the relay of messages or two way communication from the device 10 at the swimming pool or other body of water. Other enhancements or integration with swimming pool cleaning and maintenance systems can provide an all-in-one solution.

In some embodiments as shown in FIG. 4, the system 200 can further include a sensor 152 embedded in the pool alarm flotation device 10 where the sensor 152 detects instances of a motion characteristic of a body falling into a body of water and transmits information regarding the instances to a wireless receiving device such as a phone, fitness watch, smart TV, notepad, laptop computer, desktop computer, or any other device that might be within a wireless communication range of the pool alarm apparatus.

In some embodiments, and with further references to FIG. 4, a system 200 for alerting can include any number and combination of the previously described components above as well as one or more processors which when executing the computer instructions, performs the functions of detecting an object of a predetermined size falling within a body of water and/or detecting water conditions requiring service in terms of water quality appropriate for swimming.

In some embodiments, the system can utilize artificial intelligence and more particularly machine learning which can use exemplary training data and/or actual commercial use data to further refine what is intended to serve as an exemplary repetition based on a particular environment or a number of known environments. Machine learning is a method of data analysis that automates analytical model building. It is a branch of artificial intelligence based on the idea that systems can learn from data, identify patterns and make decisions with minimal human intervention. Some of the training data that can be used to help identify patterns and make decisions can include fields such as identity codes, scheduling data, location data and/or other parameters obtained from sensors such as cameras, video monitoring devices, audio devices, temperature or other sensor data that can be programmatically configured to more adequately and accurately reflect real world conditions as a system is utilized in a particular environment and hopefully across different environments. Ideally, using machine learning enables systems to automatically learn and improve from experience without being explicitly programmed. Machine learning in the embodiments herein can focus on the development of computer programs (using the Python programming language, for example) to access data and use it to learn for itself in order to better predict when to send an alert.

In some embodiments, the system can be a client device having one or more computer storage mediums containing computer instructions enabling the alerting functions described herein where the one or more processors perform the operations described above.

In some embodiments, the system can further include a computer-storage media coupled to a processor (or processors) and computer-executable instructions embodied in the computer-storage media that, when executed by one or more computing devices, perform a method that perform any number of steps such as performing the method of detecting a characteristic indicative of a body or object falling into a body of water.

Various embodiments of the present disclosure can be implemented on an information processing system. The information processing system is capable of implementing and/or performing any of the functionality set forth above. Any suitably configured processing system can be used as the information processing system in embodiments of the present disclosure. The information processing system is operational with numerous other general purpose or special purpose computing system environments, networks, or configurations. Examples of well-known computing systems, environments, and/or configurations that may be suitable for use with the information processing system include, but are not limited to, personal computer systems, server computer systems, thin clients, hand-held or laptop devices, notebook computing devices, multiprocessor systems, mobile devices, microprocessor-based systems, set top boxes, programmable consumer electronics, network PCs, minicomputer systems, mainframe computer systems, Internet-enabled television, and distributed cloud computing environments that include any of the above systems or devices, and the like. As noted previously, the data processing can be any number of data processing techniques suited for tracking repetitions of a particular exercise.

For example, the flotation device can be implemented using a mobile device that may be in communication with a server configured to implement the system using the aforementioned elements, according to an embodiment of the present disclosure. The mobile device can be, for example, a multi-modal wireless communication device, such as a "smart" phone, configured to store and execute mobile device applications ("apps"). Such a wireless communication device communicates with a wireless voice or data network using suitable wireless communications protocols. The mobile device can also be implemented using Bluetooth transceivers or transceivers that operate with other suitable communication protocols.

The system may include, inter alia, various hardware components such as processing circuitry executing modules that may be described in the general context of computer system-executable instructions, such as program modules, being executed by the system. Generally, program modules can include routines, programs, objects, components, logic, data structures, and so on that perform particular tasks or implement particular abstract data types. The modules may be practiced in various computing environments such as conventional and distributed cloud computing environments where tasks are performed by remote processing devices that are linked through a communications network. In a distributed cloud computing environment, program modules may be located in both local and remote computer system storage media including memory storage devices. Program modules generally carry out the functions and/or methodologies of embodiments of the present disclosure, as described above.

In some embodiments, a system includes at least one memory and at least one or more processor of a computer system communicatively coupled to the at least one memory. The at least one processor can be configured to perform a method including methods described above.

According to yet another embodiment of the present disclosure, a computer readable storage medium comprises computer instructions which, responsive to being executed by one or more processors, cause the one or more processors to perform operations as described in the methods or systems above or elsewhere herein.

As shown in FIG. 4, an information processing system 101 of a system 200 can be communicatively coupled with the data processing module 150 and a group of client 118 or other devices 118, or coupled to a presentation device for display at any location at a terminal or server location. According to this example, at least one processor 102, responsive to executing instructions 107, performs operations to communicate with the processing module 150 via a bus architecture 208, as shown. The at least one processor 102 is communicatively coupled with main memory 104, persistent memory 106, and a computer readable medium 120. The processor 102 is communicatively coupled with an Analysis & Data Storage 115 that, according to various implementations, can maintain stored information used by, for example, the data processing module 150 and more generally used by the information processing system 200. The data processing module 150 can be coupled to one or more sensors 152 and/or sonar sensors 5 as needed. Such other sensors can be proximity sensors, microphones, cameras, video cameras, infrared cameras, location sensors, motion detectors, biometric reading devices (e.g., iris scanners, facial recognition scanners, voice detection devices) and other devices as contemplated herein. Optionally, this stored information can be received from the client or other devices. For example, this stored information can be received periodically from the client devices and updated or processed over time in the Analysis & Data Storage 115. Additionally, according to another example, a history log can be maintained or stored in the Analysis & Data Storage 115 of the information processed over time. The data processing module 150, and the information processing system 200, can use the information from the history log such as in the analysis process and in making decisions related to a particular alert setting or alerting behavior.

The computer readable medium 120, according to the present example, can be communicatively coupled with a reader/writer device (not shown) that is communicatively coupled via the bus architecture 208 with the at least one processor 102. The instructions 107, which can include instructions, configuration parameters, and data, may be stored in the computer readable medium 120, the main memory 104, the persistent memory 106, and in the processor's internal memory such as cache memory and registers, as shown.

The information processing system 200 includes a user interface (or interfaces) 110 that comprises a user output interface 112 and user input interface 114. Examples of elements of the user output interface 112 can include a display, a speaker, one or more indicator lights, one or more transducers that generate audible indicators, and a haptic signal generator or any of the interfaces illustrated or discussed with respect to the figures or elsewhere in the application. Examples of elements of the user input interface 114 can include a keyboard, a keypad, a mouse, a track pad, a touch screen, a touch pad, a microphone that receives audio signals, a camera, a video camera, a CT-Scanner, or any other scanner that scans images. Some user inputs can be sensors or vice-versa. The received audio signals or scanned images, for example, can be converted to electronic digital representations and stored in memory, and optionally can be used with corresponding voice or image recognition software executed by the processor 102 to receive user input data and commands, or to receive test data for example.

A network interface device 116 is communicatively coupled with the at least one processor 102 and provides a communication interface for the information processing system 100 to communicate via one or more networks 108. The networks 108 can include wired and wireless networks, and can be any of local area networks, wide area networks, or a combination of such networks. For example, wide area networks including the internet and the web can intercommunicate the information processing system 100 with other one or more information processing systems that may be locally, or remotely, located relative to the information processing system 100. It should be noted that mobile communications devices, such as mobile phones, Smart phones, tablet computers, lap top computers, and the like, which are capable of at least one of wired and/or wireless communication, are also examples of information processing systems within the scope of the present disclosure. The network interface device 116 can provide a communication interface for the information processing system 100 to access the at least one database 117 according to various embodiments of the disclosure.

The instructions 107, according to the present example, can include instructions for monitoring, instructions for analyzing, instructions for retrieving and sending information and related configuration parameters and data. It should be noted that any portion of the instructions 107 can be stored in a centralized information processing system or can be stored in a distributed information processing system, i.e., with portions of the system distributed and communicatively coupled together over one or more communication links or networks.

FIGS. 1-3 illustrate examples of systems, methods or process flows, according to various embodiments of the present disclosure, which can operate in conjunction with the information processing system 200 of FIG. 4.

What is claimed is:

1. A floating alerting device for a body of water, comprising:
   a housing enclosure which floats when closed;
   a rechargeable battery within the housing enclosure;
   a wireless transmitter circuit coupled to the rechargeable battery and housed within the housing enclosure;
   one or more sonar sensors coupled to the wireless transmitter circuit and housed within the housing enclosure;
   one or more other sensors coupled to the wireless transmitter circuit and housed within the housing enclosure;
   one or more processors housed within the housing enclosure and coupled to the one or more sonar sensors configured for detecting objects entering the body of water and wherein the one or more processors are further configured to monitor weather patterns based on the one or more other sensors and/or a data source provided by one or more client devices or a database, transmit advisory information to the one or more client devices for removal of the floating alerting device from the body of water in response to a detection of a hail or a freeze condition, and further configured to send a reminder to the one or more client devices to return the floating alerting device to the body of water upon a passing of the hail or the freeze condition;
   and
   at least one solar panel mounted on a top surface of the housing enclosure and operatively coupled to the rechargeable battery for charging the rechargeable battery.

2. The floating alerting device of claim 1, wherein the floating alerting device further comprises an embedded printed circuitry that resides directly on an inner surface of the housing enclosure.

3. The floating alerting device of claim 1, wherein the floating alerting device further comprises an antenna coupled to the wireless transmitter circuit.

4. The floating alerting device of claim 1, wherein the one or more other sensors further measures water quality and water temperature of the body of water.

5. The floating alerting device of claim 1, wherein the one or more processors are configured to transmit data from the one or more sonar sensors to a remote server or a mobile application.

6. The floating alerting device of claim 1, further comprising an audible speaker housed within the housing enclosure and coupled to the one or more processors wherein the one or more processors are configured to have the wireless transmitter circuit to transmit an wireless alarm signal to the one or more client devices when the one or more sonar sensors detects motion in the body of water and awaits for a response from the one or more client devices for a threshold period of time whereupon at an expiration of the threshold period of time and lack of the response from the one or more client devices, the one or more processors causes the audible speaker to sound an audible alert.

7. The floating alerting device of claim 1, wherein the wireless transmitter circuit is a Bluetooth wireless transceiver circuit.

8. The floating alerting device of claim 1, wherein the one or more processors are configured to monitor a power level of the rechargeable battery and further cause the floating alerting device to enter a lower power mode in an event the power level drops below a predetermined power level.

9. The floating alerting device of claim 1, wherein the one or more processors are configured to create a three-dimensional model of the body of water that the floating alerting device is floating in for detections of cracks on a surrounding wall holding the body of water.

10. The floating alerting device of claim 1, wherein the floating alerting device further comprises a 360 degree camera.

11. The floating alerting device of claim 1, wherein the one or more processors are configured to monitor local weather conditions from the data source provided by the one or more client devices or the database and have the floating alerting device operate as an emergency beacon under conditions of storms, flash flooding, or sudden drops in temperature.

12. The floating alerting device of claim 1, wherein the at least one solar panel comprises two solar panels mounted angled relative to the top surface of the housing enclosure to optimize exposure to the sun.

13. The floating alerting device of claim 1, wherein the floating alerting device further comprises an anchoring device that enables the floating alerting device to remain within range of a desired location within the body of water using a propulsion system coupled to a bottom of the floating alerting device.

14. The floating alerting device of claim 13, wherein the propulsion system comprises at least two electric motors coupled to propellers.

15. The floating alerting device of claim 1, wherein the one or more processors are configured to cause the wireless transmitter circuit to communicate and be interoperable with one or more among headphones, smart televisions, smartphones, game consoles, vehicles, cell towers, pool cleaning systems, home alarm systems, desktop computers, laptop computers, tablets, or smart home appliances.

16. The floating alerting device of claim 1, wherein the floating alerting device further comprises a 360 degree camera placed below a waterline mark of the housing enclosure or towards a bottom portion of the housing enclosure.

17. The floating alerting device of claim 1, wherein the floating alerting device further comprises a speaker and a microphone coupled to the one or more processors, wherein the one or more processors are configured to enable two-way wireless audible communication.

18. A floating alerting device for a body of water, comprising:
  a housing enclosure which floats when closed;
  a rechargeable battery within the housing enclosure;
  a wireless transmitter circuit coupled to the rechargeable battery and housed within the housing enclosure;
  one or more sensors housed within or on the housing enclosure and coupled to the wireless transmitter circuit;
  one or more processors housed within the housing enclosure and coupled to the wireless transmitter circuit and the one or more sensors and configured for detecting objects entering the body of water and wherein the one or more processors are further configured to monitor weather patterns based on the one or more sensors and/or a data source provided by one or more client devices or a database, transmit advisory information to the one or more client devices for removal of the floating alerting device from the body of water in response to a detection of a hail or a freeze condition, and further configured to send a reminder to the one or more client devices to return the floating alerting device to the body of water upon a passing of the hail or the freeze condition; and
  at least one solar panel mounted on a top surface of the housing enclosure and operatively coupled to the rechargeable battery for charging the rechargeable battery.

19. The floating alerting device of claim 18, further comprising a propulsion system coupled to the bottom of the floating alerting device.

20. A floating alerting device for a body of water, comprising:
  a housing enclosure which floats when closed;
  a rechargeable battery within the housing enclosure;
  a wireless transmitter circuit coupled to the rechargeable battery and housed within the housing enclosure;
  one or more sensors coupled to the wireless transmitter circuit and housed within the housing enclosure;
  one or more processors housed within the housing enclosure and coupled to the wireless transmitter circuit and the one or more sensors and configured for detecting objects entering the body of water and wherein the one or more processors are further configured to monitor weather patterns based on the one or more sensors and/or a data source provided by one or more client devices or a database, transmit advisory information to the one or more client devices for removal of the floating alerting device from the body of water in response to a detection of a hail or a freeze condition, and further configured to send a reminder to the one or more client devices to return the floating alerting device to the body of water upon a passing of the hail or the freeze condition; and
  at least one solar panel mounted on a top surface of the housing enclosure and operatively coupled to the rechargeable battery for charging the rechargeable battery.

* * * * *